US012204679B2

(12) United States Patent
Hockenbrocht et al.

(10) Patent No.: US 12,204,679 B2
(45) Date of Patent: *Jan. 21, 2025

(54) DIFFERENTIALLY PRIVATE QUERY BUDGET REFUNDING

(71) Applicant: Snowflake Inc., Bozeman, MT (US)

(72) Inventors: Christopher Hockenbrocht, Berkeley, CA (US); Ishaan Nerurkar, Berkeley, CA (US); Alexander Rozenshteyn, Berkeley, CA (US); Liam Damewood, Walnut Creek, CA (US); David Spies, Berkeley, CA (US); Mihai Maruseac, Berkeley, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,569

(22) Filed: Jul. 24, 2023

(65) Prior Publication Data

US 2024/0005030 A1 Jan. 4, 2024

Related U.S. Application Data

(63) Continuation of application No. 16/265,936, filed on Feb. 1, 2019, now Pat. No. 11,755,769.

(51) Int. Cl.
*G06F 21/62* (2013.01)
*G06F 16/245* (2019.01)

(52) U.S. Cl.
CPC ........ *G06F 21/6245* (2013.01); *G06F 16/245* (2019.01)

(58) Field of Classification Search
CPC ............... G06F 21/6245; G06F 16/245; G06F 21/6227; G06F 16/9535
(Continued)

(56) References Cited

U.S. PATENT DOCUMENTS

| | | | |
|---|---|---|---|
| 6,038,563 A | 3/2000 | Bapat et al. |
| 6,438,549 B1 | 8/2002 | Aldred et al. |

(Continued)

FOREIGN PATENT DOCUMENTS

| | | |
|---|---|---|
| CA | 3069908 | 8/2020 |
| CN | 108537055 | 9/2018 |

(Continued)

OTHER PUBLICATIONS

Shrinkwrap: Differentially-Private Query Processing in Private Data Federations, Bater et al, Oct. 2018 (Year: 2018).*

(Continued)

*Primary Examiner* — Jahangir Kabir
(74) *Attorney, Agent, or Firm* — Schwegman Lundberg & Woessner, P.A.

(57) ABSTRACT

A differentially private security system communicatively coupled to a database storing restricted data receives a database query from a client. The database query includes a relation specifying a set of data in the database upon which to perform the query and privacy parameters associated with the query. The differentially private security system determines a worst-case privacy spend for the query based on the privacy parameters and the relation. The differentially private security system performs the query upon the set of data specified by the relation and decrements the determined worst-case privacy spend from a privacy budget associated with the client. The differentially private security system records the worst-case privacy spend and the query at a log and determines a privacy budget refund based on queries recorded in the log. The differentially private security system applies the determined privacy budget refund to the privacy budget associated with the client.

20 Claims, 5 Drawing Sheets

(58) Field of Classification Search
USPC .............................................................. 726/1
See application file for complete search history.

(56) References Cited

U.S. PATENT DOCUMENTS

| | | | |
|---|---|---|---|
| 6,546,389 B1 | 4/2003 | Agrawal et al. | |
| 6,618,721 B1 | 9/2003 | Lee | |
| 6,823,338 B1 | 11/2004 | Byrne et al. | |
| 7,219,237 B1 | 5/2007 | Trimberger | |
| 7,356,840 B1 | 4/2008 | Bedell et al. | |
| 7,698,250 B2 | 4/2010 | Dwork et al. | |
| 7,801,967 B1 | 9/2010 | Bedell et al. | |
| 9,002,803 B2 | 4/2015 | Qayyum et al. | |
| 9,094,378 B1 | 7/2015 | Yung et al. | |
| 9,244,976 B1 | 1/2016 | Zhang et al. | |
| 9,384,226 B1 | 7/2016 | Goel et al. | |
| 9,436,735 B1 | 9/2016 | Feng et al. | |
| 10,192,069 B2 | 1/2019 | Nerurkar et al. | |
| 10,229,287 B2 | 3/2019 | Nerurkar et al. | |
| 10,642,847 B1 | 5/2020 | Nerurkar et al. | |
| 10,733,320 B2 | 8/2020 | Nerurkar et al. | |
| 11,055,432 B2 | 7/2021 | Hockenbrocht et al. | |
| 11,755,769 B2 | 9/2023 | Hockenbrocht et al. | |
| 2001/0034847 A1 | 10/2001 | Gaul, Jr. | |
| 2003/0110467 A1 | 6/2003 | Balakrishnan | |
| 2003/0177118 A1 | 9/2003 | Moon et al. | |
| 2004/0225896 A1 | 11/2004 | Ng | |
| 2004/0250120 A1 | 12/2004 | Ng | |
| 2005/0278786 A1 | 12/2005 | Tippett et al. | |
| 2006/0053112 A1 | 3/2006 | Chitkara et al. | |
| 2006/0161527 A1 | 7/2006 | Dwork et al. | |
| 2006/0200431 A1 | 9/2006 | Dwork et al. | |
| 2006/0224597 A1 | 10/2006 | Fitzpatrick et al. | |
| 2006/0238503 A1 | 10/2006 | Smith et al. | |
| 2006/0265396 A1 | 11/2006 | Raman et al. | |
| 2006/0282433 A1 | 12/2006 | Dutta et al. | |
| 2007/0047558 A1 | 3/2007 | Ayers et al. | |
| 2007/0136027 A1 | 6/2007 | Dwork et al. | |
| 2007/0143289 A1 | 6/2007 | Dwork et al. | |
| 2007/0239982 A1 | 10/2007 | Aggarwal et al. | |
| 2008/0033960 A1 | 2/2008 | Banks et al. | |
| 2008/0133935 A1 | 6/2008 | Elovici et al. | |
| 2009/0119298 A1 | 5/2009 | Faitelson et al. | |
| 2009/0177685 A1 | 7/2009 | Tanyeri et al. | |
| 2009/0249436 A1 | 10/2009 | Coles et al. | |
| 2009/0254971 A1* | 10/2009 | Herz | G06Q 10/10 726/1 |
| 2009/0265354 A1 | 10/2009 | Machak et al. | |
| 2009/0327228 A1 | 12/2009 | Krause et al. | |
| 2011/0064221 A1 | 3/2011 | McSherry et al. | |
| 2011/0078143 A1 | 3/2011 | Aggarwal | |
| 2011/0125730 A1 | 5/2011 | Bordawekar et al. | |
| 2011/0131222 A1 | 6/2011 | Dicrescenzo | |
| 2011/0208763 A1 | 8/2011 | Mcsherry et al. | |
| 2011/0282865 A1 | 11/2011 | Talwar et al. | |
| 2012/0109830 A1 | 5/2012 | Vogel | |
| 2012/0143922 A1 | 6/2012 | Rane et al. | |
| 2012/0166483 A1 | 6/2012 | Choudhary et al. | |
| 2012/0197864 A1 | 8/2012 | Bourdoncle et al. | |
| 2012/0226492 A1 | 9/2012 | Tsuboi et al. | |
| 2013/0031136 A1 | 1/2013 | Shah | |
| 2013/0145473 A1 | 6/2013 | Cormode et al. | |
| 2013/0332891 A1 | 12/2013 | Schmitlin et al. | |
| 2014/0013400 A1 | 1/2014 | Warshavsky et al. | |
| 2014/0214735 A1 | 7/2014 | Harik | |
| 2014/0281572 A1 | 9/2014 | Wang et al. | |
| 2014/0282910 A1 | 9/2014 | Palmer et al. | |
| 2014/0283091 A1 | 9/2014 | Zhang et al. | |
| 2015/0235051 A1 | 8/2015 | Fawaz et al. | |
| 2015/0286827 A1 | 10/2015 | Fawaz et al. | |
| 2015/0293923 A1 | 10/2015 | Eide et al. | |
| 2016/0036827 A1 | 2/2016 | Kling et al. | |
| 2016/0105409 A1 | 4/2016 | Torman et al. | |
| 2016/0283738 A1 | 9/2016 | Wang et al. | |
| 2016/0306709 A1 | 10/2016 | Shaull | |
| 2016/0335455 A1 | 11/2016 | Mohan et al. | |
| 2017/0124152 A1 | 5/2017 | Nerurkar et al. | |
| 2017/0126694 A1 | 5/2017 | Nerurkar et al. | |
| 2017/0169253 A1* | 6/2017 | Curcio | G06F 21/6254 |
| 2017/0235974 A1 | 8/2017 | Zhang et al. | |
| 2017/0316391 A1 | 11/2017 | Peikert et al. | |
| 2017/0359364 A1 | 12/2017 | Thakurta et al. | |
| 2018/0039674 A1 | 2/2018 | Seyvet et al. | |
| 2018/0239924 A1 | 8/2018 | Rickard, Jr. et al. | |
| 2018/0239925 A1* | 8/2018 | Nerurkar | G06F 17/16 |
| 2018/0329952 A1 | 11/2018 | Ramachandra et al. | |
| 2018/0349384 A1 | 12/2018 | Nerurkar et al. | |
| 2019/0147188 A1 | 5/2019 | Benaloh et al. | |
| 2019/0318121 A1 | 10/2019 | Hockenbrocht et al. | |
| 2020/0250335 A1 | 8/2020 | Hockenbrocht et al. | |

FOREIGN PATENT DOCUMENTS

| | | |
|---|---|---|
| CN | 110198302 | 9/2019 |
| EP | 3690677 | 8/2020 |
| WO | 2015090445 | 6/2015 |
| WO | 2015157020 | 10/2015 |
| WO | 2017187207 | 11/2017 |

OTHER PUBLICATIONS

"European Application Serial No. 19785548.9, Extended European Search Report mailed Dec. 10, 2021", 10 pgs.
"European Application Serial No. 19889515.3, Extended European Search Report mailed Jun. 24, 2022", 6 pgs.
"U.S. Appl. No. 16/265,936, Non Final Office Action mailed May 9, 2019", 22 pgs.
"U.S. Appl. No. 16/265,936, Response filed Jul. 23, 2019 to Non Final Office Action mailed May 9, 2019", 15 pgs.
"European Application Serial No. 16862625.7, Extended European Search Report mailed Mar. 27, 2019", 9 pgs.
"U.S. Appl. No. 16/265,936, Final Office Action mailed Aug. 29, 2019", 27 pgs.
"U.S. Appl. No. 16/265,936, Response filed Jan. 22, 2020 to Final Office Action mailed Aug. 29, 2019", 17 pgs.
"U.S. Appl. No. 16/265,936, Examiner Interview Summary mailed Jul. 17, 2019", 3 pgs.
"U.S. Appl. No. 16/265,936, Non Final Office Action mailed Sep. 14, 2020", 27 pgs.
"U.S. Appl. No. 16/265,936, Response filed Feb. 12, 2021 to Non Final Office Action mailed Sep. 14, 2020", 17 pgs.
"International Application Serial No. PCT US2019 015035, International Search Report mailed Jun. 20, 2019", 2 pgs.
"International Application Serial No. PCT US2019 015035, Written Opinion mailed Jun. 20, 2019", 3 pgs.
"European Application Serial No. 20173244.3, Extended European Search Report mailed Sep. 14, 2020", 11 pgs.
"U.S. Appl. No. 16/265,936, Final Office Action mailed Mar. 8, 2021", 23 pgs.
"U.S. Appl. No. 16/265,936, Appeal Brief filed Nov. 5, 2021", 21 pgs.
"U.S. Appl. No. 16/265,936 Examiners Answer to Appeal Brief mailed Dec. 24, 2021", 8 pages.
"U.S. Appl. No. 16/265,936, Appeal Decision mailed Jan. 27, 2023", 8 pgs.
"U.S. Appl. No. 16/265,936, Reply Brief filed Feb. 17, 2022", 6 pgs.
"U.S. Appl. No. 16/265,936, Appeal Brief filed Mar. 24, 2023", 17 pgs.
"U.S. Appl. No. 16/265,936, Notice of Allowance mailed May 17, 2023", 12 pgs.
"European Application Serial No. 20153847.7, Extended European Search Report mailed Apr. 30, 2020", 11 pgs.
"International Application Serial No. PCT US2016 044178, International Search Report mailed Oct. 18, 2016", 3 pgs.
"International Application Serial No. PCT US2016 044178, Written Opinion mailed Oct. 18, 2016", 7 pgs.
"European Application Serial No. 20153847.7, Response filed Apr. 13, 2021 to Extended European Search Report mailed Apr. 30, 2020", 11 pgs.

(56) References Cited

OTHER PUBLICATIONS

"European Application Serial No. 20153847.7, Intention to Grant mailed Aug. 24, 2022", 39 pgs.
"European Application Serial No. 20153847.7, Noting of loss of rights pursuant to Rule 112(1) EPC mailed Jan. 25, 2023", 2 pgs.
"European Application Serial No. 20153847.7, Response filed Apr. 3, 2023 to Intention to Grant mailed Aug. 24, 2022", 10 pgs.
"Canadian Application Serial No. 3,069,908, Office Action mailed Mar. 16, 2021", 5 pgs.
"Canadian Application Serial No. 3,069,908, Office Action mailed Oct. 29, 2021", 6 pgs.
"Canadian Application Serial No. 3,069,908, Office Action mailed Aug. 19, 2022", 10 pgs.
"Canadian Application Serial No. 3,069,908, Response filed Jul. 14, 2021 to Office Action mailed Mar. 16, 2021", 27 pgs.
"Canadian Application Serial No. 3,069,908, Response filed Feb. 28, 2022 to Office Action mailed Oct. 29, 2021", 25 pgs.
"Canadian Application Serial No. 3,069,908, Response filed Jul. 4, 2023 to Office Action mailed Aug. 19, 2022", 30 pgs.
Agrawal, R., "Privacy-Preserving Data Mining", ACM SIGMOD, (May 2000), pp. 439-450.
Amirbekyan, A., "Privacy-Preserving Regression Algorithms", Proceedings of the 7th WSEAS International Conference on Simulation, Modeling, and Optimization, (2007), 37-45.
Beigi, G, "Privacy in Social Media: Identification, Mitigation and Applications", ACM Trans. Web, vol. 9, No. 4, Article 39, (Jul. 2018), 1-36.
Bost, R., "Machine Learning Classification over Encrypted Data", NDSS '15, (Feb. 8-11, 2015), 1-14.
Chaudhuri, K., "Privacy-preserving logistic regression", Advances in Neural Information Processing Systems, (2009), 8 pages.
Chaudhuri, S., "Database Access Control and Privacy: Is There a Common Ground?", CIDR 2011: Fifth C1 Biennial Conference on Innovative Data Systems Research, [Online]. Retrieved from the Internet:URL: https: www.cidrdb.org cidr2011 Papers CIDR11_Paper11.pdf, (Jan. 9-12, 2011), 96-103.
Cock, M. D, "Fast, Privacy Preserving Linear Regression over Distributed Datasets based on Pre-Distributed Data", Proceedings of the 8th ACM Workshop on Artificial Intelligence and Security, (2015), 3-14.
Dankar, Fidak, "Practicing Differential Privacy in Health Care: A Review", Transactions on Data Privacy 5, [Online]. Retrieved from the Internet:URL: http: www.tdp.cat issues11 tdp.a129a13.pdf, (2013), 35-67.
Du, Wenliang, "Privacy-Preserving Multivariate Statistical Analysis: Linear Regression and Classification", Electrical Engineering and Computer Science. Paper 12, Proceedings of the 2004 SIAM International Conference on Data Mininq, [Online]. Retrieved from the Internet: URL: https: surface.syr.edu cgi viewcontent.cgi?referer=andhttpsredir=1andarticle=1011andcontext=eecs, (1 1 2004), 222-233.
Dwork, C., "Calibrating noise to sensitivity in private data analysis", In Proceedings of the Third Conference on Theory of Cryptography, ser. TCC'06. Berlin, Heidelberg: Springer-Verlag, [Online] Retrieved from the internet:http:dx.doi.org 10.1007 1168187814, (2006), 265-284.
Dwork, C., "Differential Privacy and Robust Statistics", Proceedings of the Forty-First Annual ACM Symposium on Theory of Computing, [Online] Retrieved from the internet:http: www.stat.cmu.edu ~jingle dprs_stoc09.pdf, (Nov. 14, 2008), 41 pages.
Dwork, C., "A Firm Foundation for Private Data Analysis", Proceedings of the ACM, vol. 54, Issue 1, (Jan. 2011), 8 pages.
Dwork, Cynthia, "Differential Privacy: A Survey of Results", TAMC, LNCS 4978, Agrawal, M. et al, (eds.), (2008), 1-19.
Fang, W., "Privacy preserving linear regression modeling of distributed databases", Optimization Letters, vol. 7, (2013), pp. 807-818.
Fletcher, S, "A Differentially Private Decision Forest", Proceedings of the 13th Australasian Data Mining Conference (AusDM), Sydney, Australia, vol. 168, (2015), 99-108.
Frades, M R, "Overview on Techniques in Cluster Analysis", Bioinformatics in Clinical Research, Methods in Molecular Biology (Methods and Protocols), vol. 593, (2010), pp. 81-107.
Fraley, C., "How Many Clusters? Which Clustering Method? Answers via Model-Based Cluster Analysis", The Computer Journal, vol. 41, No. 8, (1998), 578-588.
Friedman, A., "Data Mining with Differential Privacy", Proceedings of the 16th ACM SIGKDD International Conference on Knowledge Discovery and Data Mining, [Online] Retrieved from the internet:http: users.cis.flu.edu~Izhen001 activities KDD_USB_key_2010 docs p493.pdf, (Dec. 2010), 10 pages.
Gaboardi, M., "PSI: a Private data Sharing Interface", (Aug. 4, 2018), 1-35.
Geumlek, J, "Renyi Differential Privacy Mechanisms for Posterior Sampling", NIPS 2017: Advances in Neural Information Processing Systems 30, (Oct. 2, 2017), 1-34.
Han, S., "Privacy-Preserving Gradient-Descent Methods", IEEE Transactions on Knowledge and Data Engineering, vol. 22, No. 6,, (Jun. 2010), pp. 884-899.
Huang, Yiqing, "Telco Churn Prediction with Big Data", Proceedings of the 2015 ACM SIGMOD International Conference on Management of Data, [Online] Retrieved from the internet:http: users.wpi.edu ~yli15 Includes SIGMOD15Telco.pdf, (Jun. 4, 2015), 13 pgs.
Jagannathan, G., "A Practical Differentially Private Random Decision Tree Classifier", International Conference on Data Mining Workshops, Proceedings of the ICDM International Workshop on the Privacy Aspects of Data Mining, (2009), 8 pages.
Jayaraman, B., "Evaluating Differentially Private Machine Learning in Practice", 28th USENIX Security Symposium, (Feb. 2019), 1-18.
Ji, Z., "Differential Privacy and Machine Learning: a Survey and Review", Cornell University Library—arXiv preprint, [Online] Retrieved from the internet:http: arxiv.org pdf 1412.7584.pdf, (Dec. 24, 2014), 30 pages.
Kellaris, G, "Practical differential privacy via grouping and smoothing", Proceedings of the VLDB Endowment vol. 6, No. 5, (Mar. 1, 2013), 301-312.
Koufogiannis, F., "Gradual Release of Sensitive Data under Differential Privacy", Cornel University, CrvDtoaraDhv and Securitv,, (Oct. 15, 2018), 1-22.
Liu, H, "Privacy-Presenting Monotonicity of Differential Privacy Mechanisms", Applied Sciences, vol. 8,No. 11, (Oct. 28, 2018), 1-32.
Metoui, N., "Differential Privacy Based Access Control", OTM 2016: On the Move to Meaningful Internet Systems, (Oct. 18, 2016), 962-974.
Mironov, I., "Renyi Differential Privacy", (2017), 1-13.
Nissim, K., "Smooth Sensitivity and Sampling in Private Data Analysis", Proceedings of the Thirty-Ninth Annual ACM Symposium on Theory of Computing, [Online]. Retrieved from the Internet:http: www.cse.psu.edu ~sxr48 pubs smooth-sensitivity-stoc.pdf, (Jun. 11-13, 2007), 75-84.
Patil, A., "Differential Private Random Forest", International Conference on Advances in Computing, Communications and Informatics, [Online] Retrieved from the internet:http: ieeexplore.ieee.org stamp stamp.jsp?tp-andarnumber=6968348andisnumber=6968191, (Sep. 27, 2014), 9 pages.
Peng, S., "Query Optimization for Differentially Private Data Management Systems", ICDE Conference, (2013), pp. 1093-1104.
Sanil, Ashish P, "Privacy Preserving Regression Modelling via Distributed Computation", Proceedings of the Tenth ACM SIGKDD International Conference on Knowledge Discovery and Data Mining, (2004), 677-682.
Saranya, R., "Precision-Constrained Privacy Preserving Role-Based Access Control", International Journal of Emerging Technology in Computer Science and Electronics, vol. 13, No. 1, (Mar. 2015), pp. 405-408.
Shang, S, "The Application of Differential Privacy for Rank Aggregation: Privacy and Accuracy", 17th International Conference on Information Fusion, (Jul. 7, 2014), 1-7.
Siegenthaler, Michael, "Privacy enforcement for distributed healthcare queries", 3rd International Conference on Pervasive Computing Technologies for Healthcare, (2009), 6 pgs.

(56) References Cited

OTHER PUBLICATIONS

Xiao, X., "iReduct: Differential Privacy with Reduced Relative Errors", SIGMOD' 11, (Jun. 12-16, 2011), 229-240.
Xu, J., "Differentially Private Histogram Publication", IEEE 28th International Conference on Data Engineering, (Apr. 2012), 32-43.
Zhang, J., "Functional Mechanism: Regression Analysis under Differential Privacy", Proceedings of the VLDB Endowment, vol. 5, No. 11, (2012), pp. 1364-1375.
Zhang, N., "Distributed Data Mining with Differential Privacy", IEEE ICC proceedings, (2011), 5 pages.

* cited by examiner

| Entry # | Feature 1 (cm) | Feature 2 (residence) | ... | Feature 10 (age) | Feature 11 (Disease) |
|---|---|---|---|---|---|
| 1 | 163 | Italy | | 37 | 0 |
| 2 | 136 | England | | 87 | 0 |
| 3 | 180 | France | | 54 | 1 |
| 4 | 347 | USA | | 34 | 0 |
| 5 | 388 | China | | 18 | 0 |
| 6 | 145 | France | | 13 | 1 |
| 7 | 169 | Korea | | 65 | 1 |
| 8 | 158 | USA | | 17 | 1 |

200

DIFFERENTIALLY PRIVATE QUERY BUDGET REFUNDING

CROSS-REFERENCE TO RELATED APPLICATION

This application is a continuation of U.S. application Ser. No. 16/265,936, filed Feb. 1, 2019 which is hereby incorporated by reference in its entirety.

BACKGROUND

Field of Disclosure

The present invention generally relates to database security and in particular to increasing privacy spend accuracy in a differentially private database system.

Description of the Related Art

Data about people, such as health data, financial records, location information, web browsing, and viewing habits, is valuable for analysis and collaboration. There are many technologies in which statistical or predictive analysis of personal data is beneficial. For example, medical research institutions use medical information about populations of individuals to support epidemiologic studies. Map providers use location information gathered from mobile devices carried by people to determine traffic information and provide routing guidance. Technology companies collect information describing behaviors of Internet users to improve their offerings, such as by redesigning user interfaces to improve human-computer interactions, making improved recommendations, and offering sponsored messages.

However, the personal nature of this data limits its usefulness. Government regulations provide strict rules about how personal data can be collected, used, and shared. Individuals also have expectations about how their personal data will be used, and may react negatively if it is publicly disclosed. As a result, companies that collect and maintain personal data seek ways to extract value from it without running afoul of such rules and expectations.

One set of techniques for using personal data involves removing personally-identifiable information from the data through masking, hashing, anonymization, aggregation, and tokenization. These techniques tend to be resource intensive and may compromise analytical utility. For example, data masking may remove or distort data, compromising the statistical properties of the data.

An additional technique makes use of differential privacy. Differential privacy is technology that injects noise into results provided by statistical databases in order to protect private information. Within this technological space, issues arise over how to add noise in view of different use cases, and how much noise to add. The answers to these questions can be complex due to the potential resources available to determined adversaries (e.g., the computing power available to a potential attacker trying to gain access to the private data), the resources (e.g., computing power) available to the database, and the types of queries supported by the database.

Additional issues arise when tracking privacy loss across multiple queries to a database. Different queries may result in different amounts of privacy loss. The particular amount of privacy lost by execution of a query can be difficult to determine, as it depends not only on the query, but also on any other queries that have been executed. Accurate tracking of privacy loss is important to maintaining the confidentiality of restricted data when making it available for querying without overly restricting the execution of queries. Imprecise tracking of privacy loss may cause some queries to be blocked for exceeding privacy budgets, despite not actually exceeding the budgets, thereby impeding use of the queried database.

SUMMARY

A differentially private security system is communicatively coupled to a database including restricted data. The differentially private security system receives a database query from a client. The database query includes a relation specifying a set of data in the database upon which to perform the query and privacy parameters associated with the query. The differentially private security system determines a worst-case privacy spend for the query based on the privacy parameters and the relation. The differentially private security system performs the query upon the set of data specified by the relation and decrements the determined worst-case privacy spend from a privacy budget associated with the client. The privacy budget is maintained by the differentially private security system and may be used by the differentially private security system to determine whether the database query may execute.

The differentially private security system records the worst-case privacy spend and the query at a log and determines a privacy budget refund based on queries recorded in the log. Determining the privacy budget refund based on queries in the log involves analyzing relationships among the queries. The analysis may involve generating a disjointness graph based on the queries and determining a maximum weight independent set of the disjointness graph, or determining a minimum weight vertex cover of the disjointness graph. The differentially private security system applies the determined privacy budget refund to the privacy budget associated with the client. The applied privacy budget refund can be used as part of future database queries by the client.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

System Overview

Figure 1:
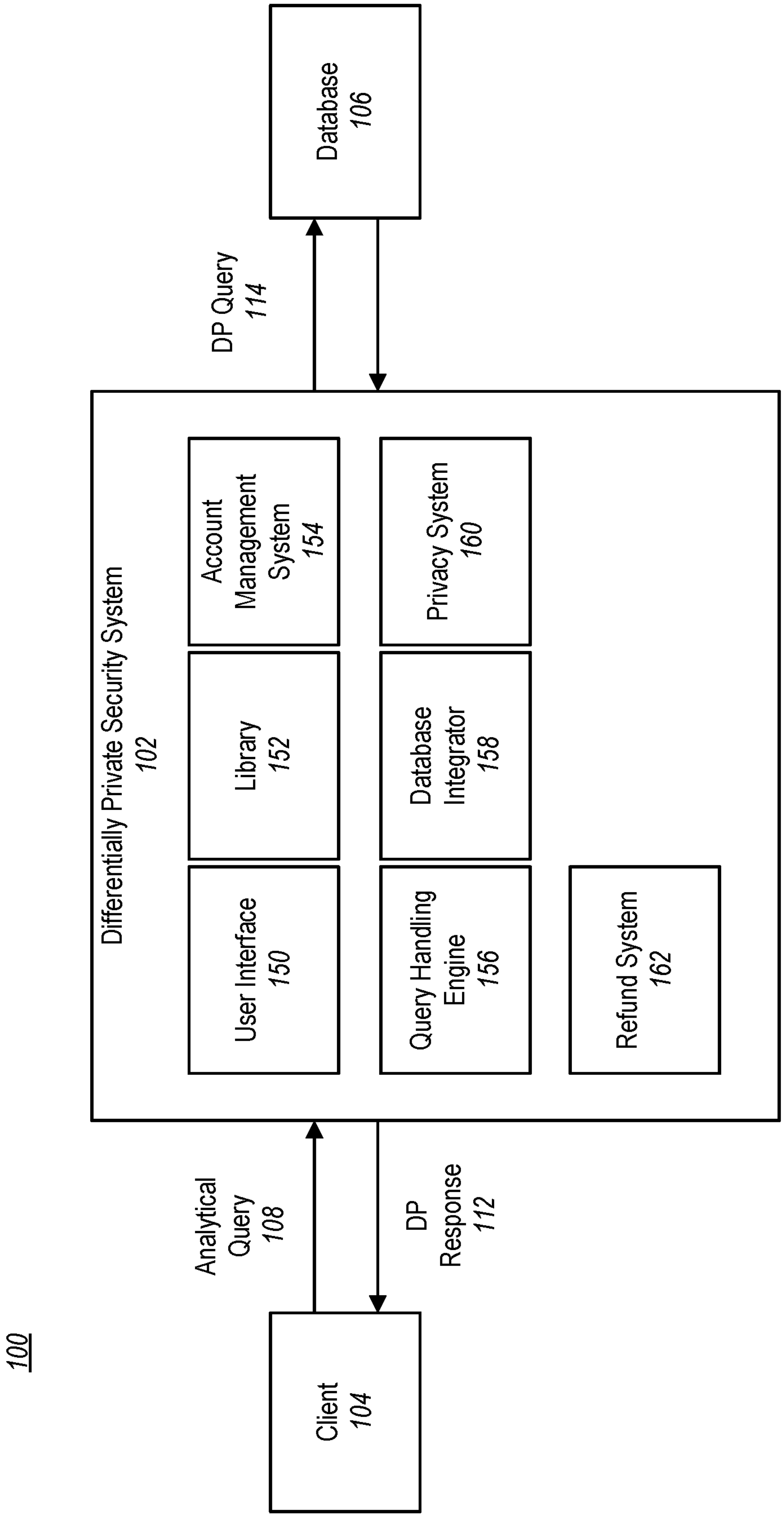
FIG. 1 illustrates a system for receiving a query for a database, and responding to the query by executing the query in a differentially manner, according to one embodiment.

FIG. 1 is a system 100 for receiving a query 108 for a database 106, and responding to the query 108 by executing the query in a differentially private (DP) manner, according to one embodiment. The system 100 includes a differentially private security system (DP system) 102 that receives an analytical query 108 from a client 104 and applies a DP version of the query 114 on the database 106. Subsequently, the DP system 102 returns the response of the DP query 114 to the client 104 as the DP response 112.

The database 106 is one or more databases managed by one or more entities. The database 106 may be managed by the same entity that manages the DP system 102 or by a different entity. The database 106 stores at least some restricted data. The restricted data may be represented as rows of records, with each record having a set of columns holding values pertaining to the record.

Restricted data is data to which access and/or usage is limited due to legal, contractual, and/or societal concerns. Examples of restricted data include health data of patients and financial records of people, businesses or other entities. Similarly, restricted data may include census data or other forms of demographic data describing people, businesses, or other entities within geographic areas. Restricted data also includes usage data describing how people interact with electronic devices and/or network-based services. For example, restricted data may include location data describing geographic movements of mobile devices, consumption history data describing how and when people consume network-based content, and the particular content consumed (e.g., music and/or video content), and messaging data describing when and to whom users send messages via mobile or other electronic devices.

A client 104 is used to access the restricted data in the database 106. A client 104 is an electronic device such as a desktop, laptop, or tablet computer or a smartphone used by a human user to access the database 106. The client 104 and user may be, but are not necessarily, associated with the entities that manage the database 106 and/or DP system 102. Users of the client 104 include administrators and analysts. Administrators use the clients 104 to access the DP system 102 and/or database 106 to perform administrative functions such as provisioning other users and/or clients 104, and configuring, maintaining, and auditing usage of the system and/or database. The administrators may access the DP system 102 and database 106 directly via administrative interfaces that allow users with appropriate credentials and access rights to perform the administrative functions.

Analysts use the clients 104 to apply analytical queries 108 to the restricted data in the database 106. The clients 104 used by the analysts access the database 106 only through the DP system 102. Depending upon the embodiment, the analyst and/or client 104 may have an account provisioned by an administrator which grants the analyst or client certain rights to access the restricted data in the database 106.

The rights to the restricted data may be specified in terms of a privacy budget. The privacy budget describes limits on how much of the restricted data can be released. In one embodiment, the privacy budget is a numerical value representative of a number and/or type of remaining queries 108 available. The privacy budget may be specified in terms of a query, analyst, client 104, entity, globally, and/or time period. For example, the privacy budget may specify limits for an individual query, with each query having a separate budget. The privacy budget may also specify limits for an analyst or client, in which case the budget is calculated cumulatively across multiple queries from a client or analyst. For a privacy budget specified for an entity, such as an organization having multiple clients 104 and users, the privacy budget is calculated cumulatively across the multiple queries from clients and users associated with the entity. A global privacy budget, in turn, is calculated across all queries to the database, regardless of the source of the query. The privacy budget may also specify an applicable time period. For example, the privacy budget may specify that queries from particular clients may not exceed a specified budget within a given time period, and the budget may reset upon expiration of the time period. Depending upon the embodiment, client, as used herein, may alternatively or additionally refer to a user using the client to access the DP system 102, to a user account registered with the DP system 102, to a group of users or to a group of clients 104, and/or to another entity that is a source of queries.

As discussed above, a client 104 sends an analytical query 108 to the DP system 102 and also receives a differentially private response 112 to the query from the system. The queries 108 submitted by the client 104 may be simple queries, such as count queries that request the number of entries in the databases 106 that satisfy a condition specified by the client 104, or complicated queries, such as predictive analytics queries that request a data analytics model trained on the databases 106. Specific types of queries are discussed in more detail below.

Each query has an associated set of privacy parameters. The privacy parameters indicate the amount of restricted data to release from the database 106 to the client 104 in response to the query 108. The privacy parameters likewise indicate the amount of decrease in the relevant privacy budget (e.g., the budget for the client 104 or entity with which the client is associated) in response to the query 108. In one embodiment, the client 104 specifies a set of associated privacy parameters with each submitted query 108. In other embodiments, the privacy parameters are specified in other ways. The DP system 102 may associate privacy parameters with received queries (rather than obtaining the parameters directly from the query). For example, the DP system 102 may apply a default set of privacy parameters to queries that do not specify the parameters. The values of the default privacy parameters may be determined based on the client 104, analyst, query type, and/or other factors.

The DP system 102 receives an analytical query 108 from the client 104 and returns a differentially private response 112 to the client. In one embodiment, the DP system 102 determines the privacy parameters associated with the query, and evaluates the parameters against the applicable privacy budget. If the analytical query 108 and associated privacy parameters exceeds the privacy budget, the DP system 102 may deny (i.e., not execute) the query. Alternatively, the DP system 102 may adjust the privacy parameters to fall within the privacy budget, and execute the query using the adjusted privacy parameters. If the privacy parameters do not exceed the privacy budget, the DP system 102 executes a DP version of the query 114 on the database 106, such that it releases a degree of restricted data from the database 106 indicated by the privacy parameters specified by the client 104, and also protects a degree of privacy of the restricted data specified by the privacy budget. For example, an administrator of the database 106 may set a privacy budget specifying a maximum threshold on the amount of restricted data released by given query 108 that the client 104 may not exceed. Thus, the DP system 102 balances privacy protection of the restricted data in the database 106 while releasing useful information on the database 106 to the client 104.

The DP query 114 applied to the database 106 by the DP system 102 is a differentially private version of the query 108 that satisfies a definition of differential privacy described in more detail with reference to the privacy system 160 in FIG. 3. The DP system 102 may apply the DP query 114 to the database 106 by transforming the analytical query 108 into one or more queries derived from the analytical query that cause the database 106 to release differentially private results. The DP system 102 may then return these differentially private results to the client as the DP response 112. The DP system 102 may also, or instead, apply the DP query 114 to the database 106 by transforming the analytical query into one or more derived queries that cause the database to release results that are not necessarily differentially private. The DP system 102 may then transform the released results in a way that enforces differential privacy to produce the DP response 112 returned to the client 104. These transformations may involve perturbing the process by which the DP query 114 is produced from the analytical query 108 and/or perturbing the results released by the database 106 with noise that provides the differential privacy specified by the privacy parameters while enforcing the privacy budget.

The DP system 102 allows an analyst to perform database queries on restricted data, and thereby perform analyses using the DP responses 112 returned by the queries, while maintaining adherence with privacy parameters and a privacy budget. In addition, the techniques used by the DP system 102 allow database queries to access restricted data in ways that do not compromise the analytical utility of the data. The DP system 102 supports a wide variety of analytical and database access techniques, described in more detail below, and provides fine-grained control of the privacy parameters and privacy budget when using such techniques. The DP system 102 thus provides an improved database system having expanded and enhanced access to restricted data relative to other database systems.

An analyst can use the DP system 102 for a variety of different purposes. In one embodiment, the restricted data in the database 106 includes training data describing features of entities relevant to a particular condition. The analyst uses the DP system 102 to build one or more differentially private machine-learned models, such as classifiers, from the training data. The analyst can apply data describing a new entity to the machine-learned models, and use the outputs of the models to classify the new entity as having, or not having the condition. However, an adversary cannot use the information in the machined-learned models to ascertain whether individual entities described by the training set have the condition due to the differentially private nature of the models.

Such models may be retained and executed within the DP system 102. For example, an analyst can issue an analytical query 108 that causes the DP system 102 to interact with the restricted data in the database 106 to build the machine-learned models. The DP system 102 can then store the models within the system or an associated system. The analyst can use a new analytical query 108 or another interface to the system 102 to apply the data describing the new entity to the models. The DP system 102 can execute the new data on the stored models and output the classification of the entity as a DP response 112. Alternatively or in addition, the DP system 102 can output the trained models as a DP response 112, and an analyst can store and apply data to the models using different systems in order to classify the entity.

Examples of the types of classifications that may be performed using such models include determining whether a person (the entity) has a medical condition. In this example, the restricted training data include health data describing patients that are labeled as having or not having a given medical condition. The analyst applies health data for a new patient to the one or more differentially private machine-learned models generated from the restricted training data in order to diagnose whether the new patient has the medical condition.

Another example classification that may be performed using such models involves identifying fraudulent or otherwise exceptional financial transactions. In this example, the restricted training data includes financial transaction data associated with one or more people or institutions, where the transactions are labeled as being exceptional or not exceptional. The analyst applies financial transaction data for a new transaction to the one or more differentially private machine-learned models generated from the restricted training data in order to determine whether the new transaction is exceptional. The analyst can block, flag, or otherwise report an exceptional transaction.

As shown in FIG. 1, the DP system 102 includes a user interface 150, a library 152, an account management system 154, a query handling engine 156, a data integration module 158, a privacy system 160, and a refund system 162. Some embodiments of the DP system 102 have different or additional modules than the ones described here. Similarly, the functions can be distributed among the modules in a different manner than is described here. Certain modules and functions can be incorporated into other modules of the DP system 102.

The user interface 150 generates a graphical user interface on a dedicated hardware device of the DP system 102 or the client 104 in which the client 104 can submit an analytical query 108 and the desired privacy parameters, view the DP response 112 in the form of numerical values or images, and/or perform other interactions with the system. The client 104 may also use the graphical user interface to inspect the database 106 schemata, view an associated privacy budget, cache the DP response 112 to view the response later, and/or perform administrative functions. The user interface 150 submits properly formatted query commands to other modules of the DP system 102.

The library 152 contains software components that can be included in external programs that allow the client 104 to submit the analytical query 108, receive the DP response 112, and other functions within a script or program. For example, the client 104 may use the software components of the library 152 to construct custom data analytic programs. Each of the software components in the library 152 submits properly formatted query commands to other modules of the DP system 102.

The account management system 154 receives properly formatted query commands (herein "query commands" or "QC"), parses the received query commands, and verifies that the commands are syntactically correct.

Examples of query commands accommodated by the DP system 102 are listed below.

QC1. Count

'SELECT COUNT (<column>) FROM <database.table> WHERE <where_clause> BUDGET <eps> <delta>.

QC2. Median

'SELECT MEDIAN (<column>) FROM <database.table> WHERE <where_clause> BUDGET <eps> <delta>.

QC3. Mean

'SELECT MEAN (<column>) FROM <database.table> WHERE <where_clause> BUDGET <eps> <delta>.

QC4. Variance

'SELECT VARIANCE (<column>) FROM <database.table> WHERE <where_clause> BUDGET <eps> <delta>.

QC5. Inter-Quartile Range

'SELECT IQR (<column>) FROM <database.table> WHERE <where_clause> BUDGET <eps> <delta>.

QC6. Batch Gradient Descent

'SELECT <GLM>(<columns_x>,<column_y>, <params>) FROM <database.table> WHERE <where_clause> BUDGET <eps> <delta>.

QC7. Stochastic Gradient Descent

'SELECT SGD <GLM>(<column>) FROM <database.table> WHERE <where_clause> BUDGET <eps> <delta>.

QC8. Random Forest

'SELECT RANDOMFOREST (<columns_x>,<columns_y>) FROM <database.table> WHERE <where_clause> BUDGET <eps> <delta>.

QC9. Histogram

'SELECT HISTOGRAM (<column>) FROM <database.table> WHERE <where_clause_i> BUDGET <eps> <delta>.

The query handling engine 156 transforms the received query commands into appropriate function calls and database access commands by parsing the query command string. The function calls are specific to the query 108 requested by the client 104, and the access commands allow access to the required database 106. Different databases 106 require different access commands. The access commands are provided to the database integrator 158.

The database integrator 158 receives the access commands to one or more databases 106, collects the required databases, and merges them into a single data object. The data object has a structure similar to that of a database structure described in reference to FIG. 2. The data object is provided to the privacy system 160.

The privacy system 160 receives the data object from the database integrator 158, appropriate function calls from the query handling engine 156 indicating the type of query 108 submitted by the client 104, and privacy parameters specified for the query 108. The privacy system 160 evaluates the privacy parameters against the applicable privacy budget and either denies or allows the query. If the query is denied, the privacy system 160 outputs a response indicating that the query did not execute. If the query is allowed, the privacy system 160 executes the query and outputs a DP response 112 to a differentially private version of the query 108 with respect to the database 106. The privacy system 160 may also decrement the applicable privacy budget to account for the executed query. The privacy system 162 incorporates privacy budget refunds from the refund system 162 into applicable privacy budgets. In an embodiment, the refund system 162 is a component of the privacy system 162. In an embodiment, privacy budgets are stored at logs in a log store of the refund system 162.

The refund system 162 periodically determines privacy budget refunds to add to privacy budgets, which clients may use as privacy spend to perform additional queries of the database 106. The refund system 162 determines a privacy budget refund by analyzing relationships among historic queries requested by the client 104 and then determining a more precise cumulative privacy loss for those queries based on the analysis. The refund system 162 adds an amount of privacy spend back to the client's 104 privacy budget such that it more accurately reflects the more precise cumulative privacy loss. The amount of privacy spend added back to the client's 104 privacy budget is the privacy budget refund. In this manner, use of the database 106 is improved, as privacy budgets are more precise, enabling more accurate handling of queries by the DP system 102. For example, queries which would have been blocked by the DP system 102 from executing due to a lack of remaining privacy budget may instead be performed by the DP system 102 due to the increased privacy spend added to the privacy budget by a privacy budget refund.

Figures 2, 3:
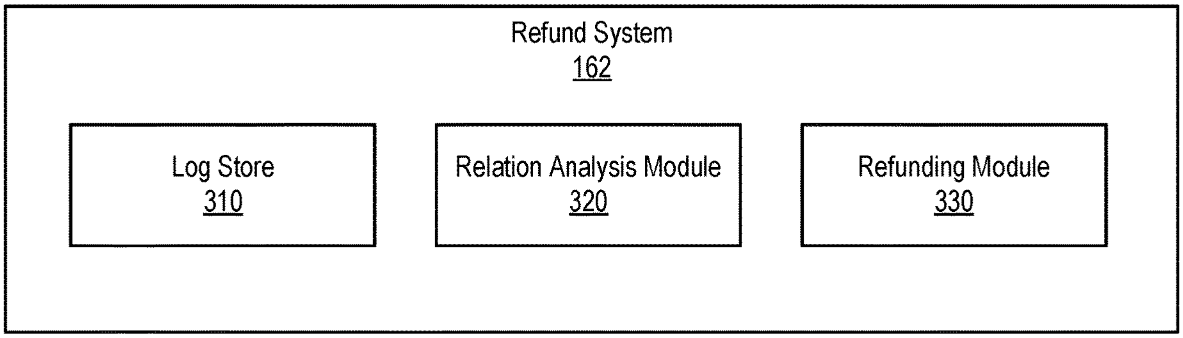
FIG. 2 illustrates an example database structure, according to one embodiment.
FIG. 3 illustrates a refund system, according to one embodiment.

FIG. 2 illustrates an example database structure, according to one embodiment. The database 200 includes a data table, which may be referred to as a matrix, with a number of rows and columns. Each row is an entry of the database and each column is a feature of the database. Thus, each row contains a data entry characterized by a series of feature values for the data entry. For example, as shown in FIG. 2, the example database 200 contains a data table with 8 entries and 11 features, and illustrates a list of patient profiles. Each patient is characterized by a series of feature values that contain information on the patient's height (Feature 1), country of residence (Feature 2), age (Feature 10), and whether the patient has contracted a disease (Feature 11). A row is also referred to as a "record" in the database 106. The database 106 may include more than one data table. Henceforth a data table may be referred to as a "table."

The feature values in the database 200 may be numerical in nature, e.g., Features 1 and 10, or categorical in nature, e.g., Features 2 and 11. In the case of categorical feature values, each category may be denoted as an integer. For example, in Feature 11 of FIG. 2, "0" indicates that the patient has not contracted a disease, and "1" indicates that the patient has contracted a disease.

Definition of Differential Privacy

For a given query 108, the privacy system 160 receives a data object X, function calls indicating the type of query 108, privacy parameters specified by the client 104, and outputs a DP response 112 to a differentially private version of the query 108 with respect to X. Each data object X is a collection of row vectors $x_{i=1, 2, \ldots, n}$, in which each row vector x; has a series of p elements $x_i^{j=1, 2, \ldots, p}$.

A query M satisfies the definition of ε-differential privacy if for all:

$$\forall X, X' \in \mathbb{D}, \forall S \subseteq \text{Range}(M): \frac{Pr[M(X) \in S]}{Pr[M(X') \in S]} \leq e^{\varepsilon}$$

where $\mathbb{D}$ is the space of all possible data objects, Sis an output space of query M, and neighboring databases are defined as two data objects X, X' that have at most one different entry from one another. That is, given two neighboring data objects X, X' in which one has an individual's data entry, and the other does not, there is no output of query M that an adversary can use to distinguish between X, X'. That is, an output of such a query M that is differentially private reveals no information about the data object X. The privacy parameter E controls the amount of information that the query M reveals about any individual data entry in X, and represents the degree of information released about the entries in X. For example, in the definition given above, a small value of e indicates that the probability an output of query M will disclose information on a specific data entry is small, while a large value of e indicates the opposite.

As another definition of differential privacy, a query M is (ε,δ)-differentially private if for neighboring data objects X, X':

$$\forall\, X, X' \in \mathbb{D}, \forall\, S \subseteq \text{Range }(M): \frac{Pr[M(X) \in S]}{Pr[M(X') \in S]} \leq e^{\varepsilon} + \delta.$$

The privacy parameter δ measures the improbability of the output of query M satisfying ε-differential privacy. As discussed in reference to FIG. 1, the client 104 may specify the desired values for the privacy parameters (ε,δ) for a query 108.

There are three important definitions for discussing the privacy system 160: global sensitivity, local sensitivity, and smooth sensitivity. Global sensitivity of a query M is defined as $$GS_M(X) = \max_{X,X':d(X,X')=1} \|M(X) - M(X')\|$$

where X, X' are any neighboring data objects, such that d(X, X')=1. This states that the global sensitivity is the most the output of query M could change by computing M on X and X'.

The local sensitivity of a query Mon the data object X is given by:

$$LS_M(X) = \max_{X':d(X,X')=1} \|M(X) - M(X')\|$$

where the set {X': d(X, X')=1} denotes all data objects that have at most one entry that is different from X. That is, the local sensitivity $LS_M(X)$ is the sensitivity of the output of the query M on data objects X' that have at most one different entry from X, measured by a norm function.

Related to the local sensitivity $LS_M(X)$, the smooth sensitivity given a parameter β is given by:

$$S_M(X; \beta) = \max_{X' \in \mathbb{D}} \left\| LS_M(X) \cdot e^{-\beta \cdot d(X,X')} \right\|$$

where d(X, X') denotes the number of entries that differ between X and X'.

Notation for Random Variables

The notation in this section is used for the remainder of the application to denote the following random variables.

1) $G(\sigma^2)$, denotes a zero-centered Gaussian random variable with the probability density function $$f(x \mid \sigma^2) = \frac{1}{\sigma\sqrt{2\pi}} e^{-\frac{x^2}{2\sigma^2}}.$$

2) L(b) denotes a zero-centered Laplacian random variable with the probability density function $$f(x \mid b) = \frac{1}{2b} e^{-\frac{|x|}{b}}.$$

3) C(γ) denotes a zero-centered Cauchy random variable with the probability density function $$f(x \mid \gamma) = \frac{1}{\pi\gamma\left(1 + \left(\frac{x}{\gamma}\right)^2\right)}.$$

Further, a vector populated with random variables R as its elements is denoted by v(R). A matrix populated with random variables R as its elements is denoted by M(R).

Refund System

FIG. 3 illustrates the refund system 162, according to one embodiment. The refund system 162 refunds privacy spend to a client 104 privacy budget based on relationships among queries requested by the client 104 and their respective privacy spends. The refunded privacy spend may then be used by the client 104 for additional queries. The refund system 162 includes a log store 310, a relation analysis module 320, and a refunding module 330.

The log store 310 stores a log of database activity, particularly queries, privacy spends and privacy budget refunds, on a per-client basis. In an embodiment, the log store 310 stores a log of database activity on a per-table and/or per-database 106 basis as well, which may depend upon whether the DP system 102 maintains privacy budgets for tables and/or databases in addition to clients. For clarity of explanation, the present disclosure refers solely to clients, though the techniques described herein also apply to logs and privacy budgets of tables, databases, and groups of clients.

Each query submitted by a client 104 is recorded in the log store 310, along with the query's worst-case privacy spend and the relation upon which the query is run. The log store 310 may maintain a different log for each client 104. In some embodiments the log store 310 also tracks privacy budgets, whether in addition to or instead of the privacy system 160.

The privacy spend of a query is the particular value of one or more privacy parameters used when the DP system 102 performs the query, as modified by one or more factors, as detailed below. For example, QC1 above includes "BUDGET <eps> <delta>" where <eps> is an epsilon value (ε) and <delta> is a delta value (δ). ε describes a degree of information released about a dataset due to the query and δ describes an improbability of the query satisfying (ε)-differential privacy. ε and δ are privacy parameters; depending upon the embodiment, queries include one or both of these privacy parameters, and may include additional privacy parameters in alternative embodiments, which together are the privacy spend.

Privacy spend may be magnified by a sensitivity of the query, which the DP system 102 calculates when performing the query. As discussed above, a query may have global sensitivity, local sensitivity, and smooth sensitivity. The sensitivity of the query can depend upon the relation over which the query is evaluated. When determining a privacy spend of the query, the DP system 102 assumes the worst case (e.g. highest privacy spend) scenario, including the highest sensitivity value possible given the relation. Upon executing a query, the DP system 102 records the worst-case privacy spend of a query in the log 310 with the query, and subtracts the worst-case privacy spend from the client's 104 privacy budget.

A relation is an indicator that specifies a dataset from the database 106 to be queried. Different queries can be performed upon different datasets, which are indicated by the relations included in the queries. For example, a first query could a relation indicating Features 4-5 of Entries 4-8 in the database 200, and a second query could include a relation indicating Features 1-3 of Entries 1-6. The particular relation a query is to execute upon may be indicated within the query via a formal language, such as Structured Query Language (SQL).

In addition to query information, the log store 310 also records refunds of privacy spend to privacy budgets. The refund system 162 periodically refunds clients 104 privacy spend based on evaluation of the database activity, e.g. previous queries, recorded in the log store 310. As mentioned above, the DP system 102 executes each query with the assumption of worst-case scenario, with the highest privacy loss possible for the query, as measured by privacy parameter spend. However, not every query in fact results in a worst-case scenario. As such, the refund system 162 determines the difference between the worst-case scenario privacy parameter spend (that has been subtracted from the client's 104 privacy budget) and the actual privacy parameter spend. Determining the privacy budget refund may involve the refund system 162 checking whether a refund pertinent to the relation included in the query has already been applied to the privacy budget of the client 104, in which case the refund system 162 factors for the previous privacy budget refund, e.g. reducing the privacy budget refund or canceling the privacy budget refund. The refund system 162 then applies the difference as a privacy budget refund to the client's 104 privacy budget for use in subsequent queries, e.g. the refund system 162 sends the privacy budget refund to the privacy system 160 for addition to the privacy budget of the client 104.

Depending upon the embodiment, the refund system 162 may determine privacy budget refunds at one or more intervals or upon occurrence of one or more events. In one embodiment, the refund system 162 determines privacy budget refunds at regular or irregular time periods, such as every day, once a week, or twice a month. In another embodiment, the refund system 162 determines privacy budget refunds each time the client 104 queries the database 106. In yet another embodiment, the refund system 162 determines privacy budget refunds each time a new relation is added to the log store 310 in association with the client 104. Upon recordation of a query in the log store 310, the refund system 162 checks whether the relation included in the query is included in any other query by the client 104 previously recorded in the log store 310. If not, it is a new relation, and the refund system 162 therefore determines a privacy budget refund for the client 104.

Some queries do not in fact result in a worst-case privacy spend due to the relations the queries execute upon. If a query requested by a client 104 executes upon a relation that is disjoint from other relations upon which other queries by the client 104 have been executed, then the query does not in fact cause as great a loss of privacy as a worst-case scenario. This is due to the worst-case scenario including the execution of a query over a relation upon which another query by the client 104 has been executed, thus releasing further information about the same relation, thereby decreasing the differential privacy maintained for the data covered by that relation. Queries over disjoint datasets therefore do not result in worst-case privacy loss, and therefore do not require worst-case privacy spend.

In an embodiment, the log store 310 maintains a soft budget and a hard budget for the client 104, which may be set by an administrator of the DP system 102. The hard budget is a privacy budget that cannot be exceeded whatsoever, and queries which would overspend the hard budget are blocked. The soft budget is a privacy budget, less than the hard budget, that may be temporarily exceeded until after a privacy budget refund. Upon application of a privacy budget refund by the DP system 102, if the privacy budget falls below the soft budget, then additional queries may again exceed it. However, if, upon application of the privacy budget refund, the soft budget remains exceeded, further queries are blocked. In this manner, the client 104 may use its full privacy budget and account for privacy budget refunds before they are applied, such that queries are not blocked despite being within budget simply because the privacy budget refund has not yet been applied. In this manner, the soft budget and hard budget together prevent situations where a query cannot proceed because of a lack of privacy budget, where the lack of privacy budget is due to a privacy budget refund having not yet been applied.

When performing a privacy budget refund for a client 104, the relation analysis module 320 analyzes the records in the log store 310 associated with the client 104 and constructs a disjointness graph based on the analysis that can be used to determine the privacy budget refund for the client 104. The disjointness graph is a weighted undirected graph where each vertex represents a relation in the log store 310 for the client 104, each vertex weight represents the total privacy spend for the relation represented by the vertex, and each edge represents disjointness between the two vertices connected by the edge.

When constructing the disjointness graph, the relation analysis module 320 determines whether each pair of vertices in the disjointness graph is disjoint, and adds an edge between the pair if they are. Disjointness is a characteristic of relations. Two or more relations are disjoint if no records can overlap among the datasets represented by the relations. For example, a hospital with records for patients includes records for male patients and female patients. A first relation indicating all male patients and a second relation indicating all female patients are disjoint, as patients are classified as the one or the other, and there therefore cannot be any overlap between the first and second relations. As such, information released about the records in the second relation cannot provide additional information about the records in the first relation, as none of the records in the first relation are in the second relation.

Two relations are disjoint if the datasets logically cannot overlap, such as due to the relations including conditions that are not simultaneously satisfiable. Whether a first relation and a second relation are disjoint may be determined in a variety of ways depending upon the relations. There are multiple types of relations, including "tables," "splits," "wheres," "unions," and "selects." If a relation is a select, it does not affect disjointness. A query can include more than one relation, such as a select, a where, and a table.

If the first relation and the second relation are both tables, then they are disjoint if they are different tables. If they are the same table, they are not disjoint.

A split is a relation where a dataset is partitioned into multiple partitions of the dataset that are mutually exclusive but cumulatively covering of the dataset. If the first relation and the second relation are both splits, they are disjoint if they refer to different partitions of the same dataset. If they are the same partition, they are not disjoint.

If a first relation is a where, it by definition includes another relation, e.g. a table or a split. The relation analysis module 320 checks whether the table or the split is disjoint with the second relation. If so, the first and the second relations are disjoint. If not, the relation analysis module 320 checks whether the where clause is simultaneously satisfiable with the second relation, e.g. a where relation. If the where in the first relation and the where in the second relation are not simultaneously satisfiable, the first relation and the second relation are disjoint, otherwise the relation analysis module 320 identifies the first relation and the second relation as not disjoint. For example, for two queries in SQL:

Q1: SELECT*FROM TABLE_X WHERE SEX='Male'

Q2: SELECT*FROM TABLE_X WHERE SEX='Female'

Q1 and Q2 are disjoint, as the sex (SEX) of patients in the table (TABLE_X) is either 'Male' or 'Female' and cannot be both. Thus, the where clause of Q1 and the where clause of Q2 are not simultaneously satisfiable—a patient is not both male and female. As a second example, consider two additional queries in SQL:

Q3: SELECT*FROM TABLE_X WHERE SEX='Female'

Q4: SELECT*FROM TABLE_X WHERE HEIGHT>7

The relation analysis module 320 would not find Q3 and Q4 to be disjoint. Though it is unlikely a patient would be both female and over seven feet tall (HEIGHT>7) it is not impossible. As such, queries Q3 and Q4 are simultaneously satisfiable and therefore not disjoint. Thus, the relation analysis module 320 would not find Q3 and Q4 to be disjoint under any circumstances, even if there were without a doubt no women over seven feet tall in the dataset.

If a relation is a union, then it is disjoint if all pairs of relations included in the union are disjoint. For example, a union of three relations: relation r1, male patients in hospital 1; relation r2, female patients in hospital 1; and relation r3, male patients in hospital 2. r1 and r2 are disjoint because they are not simultaneously satisfiable—patients cannot be both male and female simultaneously. r1 and r3 are disjoint because they also are not simultaneously satisfiable, as a patient cannot be a patient at both hospital 1 and hospital 2 simultaneously. r2 and r3 are disjoint for two reasons-patients cannot be both male and female, and patients cannot be patients at both hospital 1 and hospital 2 simultaneously. As such, each pair of relations in the union is disjoint, so the union is disjoint.

The refunding module 330 uses the disjointness graph constructed by the relation analysis module 320 to determine a privacy budget refund, and then applies the determined privacy budget refund to the privacy budget of the client 104 for whom the disjointness graph was constructed. This may entail sending the privacy budget refund to the privacy system 160 for addition to the privacy budget of the client 104. For example, if the client's 104 privacy budget includes 10ε and 5δ, and the determined privacy budget refund applied to the privacy budget includes 2ε and 1δ, then the client's 104 privacy budget updates to 12ε and 6δ after the determined privacy budget refund is applied to the privacy budget. The refunding module 330 also records the privacy budget refund in the log store 310 in association with the client 104. As such, future privacy budget refunds will not doubly account for the privacy budget refund, as the adjustment is recorded in the log store 310.

The refunding module 330 determines the privacy budget refund using the disjointness graph via one or more techniques, depending upon the embodiment. In one embodiment, the refunding module 330 identifies a maximum weight independent set (MWIS) for the disjointness graph. A MWIS is a set of relations (i.e. vertices in the disjointness graph) such that (1) no two relations in the MWIS are disjoint (i.e. no two vertices in the MWIS share and edge), and (2) the sum of the privacy spends of the relations (i.e. vertex weights) in the set is greater than or equal to that of any other set that satisfies condition (1). The refunding module 330 determines a MWIS by identifying a set of independent sets of vertices, where each independent set is a set satisfying condition (1). For each of at least some of the independent sets in the set of independent sets, the refunding module 330 sums the weights of the vertices in the independent set. The refunding module 330 then identifies an independent set of the at least some of the independent sets that has a greatest vertex weight sum, thus satisfying condition (2). The identified independent set is the MWIS for the disjointness graph. The refunding module 330 determines a difference between the total privacy spend for the disjointness graph (i.e. the sum of all the vertex weights) and the determined sum of the privacy spends of the relations in the identified MWIS. The determined difference is the privacy budget refund, which the refunding module 330 applies to the privacy budget.

In another embodiment, the refunding module 330 identifies a minimum weight vertex cover (MWVC) for the disjointness graph. The MWVC is a set of vertices such that (1) each edge is covered and (2) the sum of the vertex weights of the vertices in the set is less than that of any other set that satisfies condition (1). An edge is covered if at least one vertex it connects to in the disjointness graph is included in the set of vertices. The refunding module 330 determines the MWVC by identifying a set of vertex-covering sets. Each vertex-covering set includes vertices such that each edge in the disjointness graph is covered, thereby satisfying condition (1). For each vertex-covering set in the set of vertex-covering sets, the refunding module 330 sums the vertex weights of each vertex in the vertex-covering set. The refunding module 330 then identifies the vertex-covering set in the set of vertex-covering sets with the lowest vertex weight sum, thereby satisfying condition (2). The identified vertex-covering set with the lowest vertex weight sum is the MWVC. Upon determining the MWVC, the refunding module 330 directly applies the vertex weight sum of the vertices in the MWVC to the privacy budget as the privacy budget refund.

Determining the worst-case privacy cost of a query is faster and requires fewer computing resources than determining a precise privacy cost of the query. However, using solely worst-case privacy costs decreases the privacy budget more quickly than using precise privacy costs, thus allowing the execution of fewer queries. However, periodic privacy budget refunds make up the difference between the worst-case privacy costs and the actual privacy costs of queries by the client 104. As such, by using the worst-case privacy cost when executing a query, then asynchronously determining a privacy budget refund for the query, the DP system 102 enables rapid query execution while simultaneously maintaining a highly accurate privacy budget that reflects the true privacy cost of queries executed by the client 104. Therefore, the techniques described herein provide the benefits of using worst-case privacy costs and using precise privacy costs, while mitigating the drawbacks of both. This improves use of the database 106, as more precise privacy budgets enable more accurate handling of queries, reducing instances where queries are blocked unnecessarily.

Processes

Figure 4:
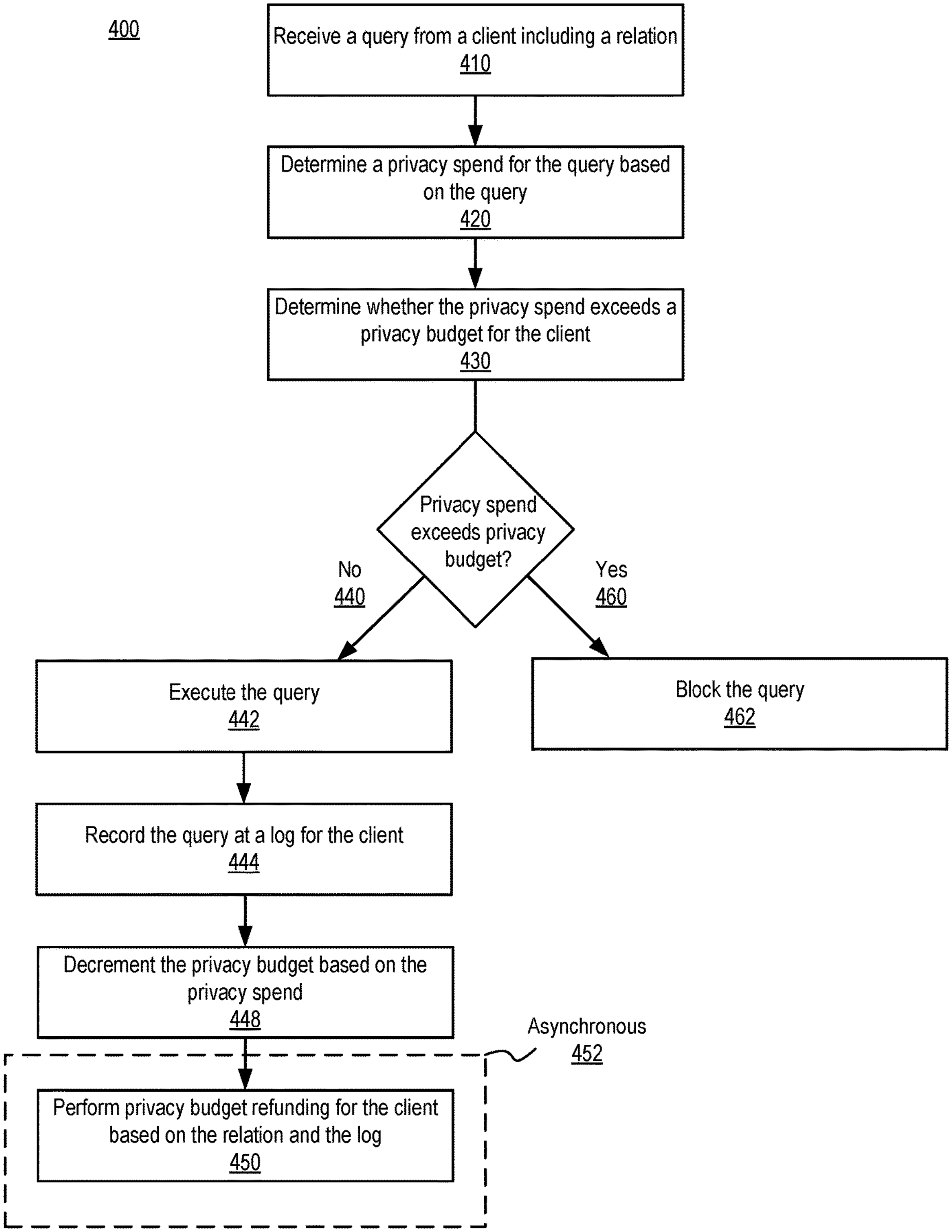
FIG. 4 illustrates a process for executing a query, according to one embodiment.

FIG. 4 illustrates a process 400 for executing a query, according to one embodiment. The DP system 102 receives 410 a query from a client 104. The query includes a relation that specifies a dataset over which the DP system 102 is to execute the query. The query also includes values for one or more privacy parameters for the DP system 102 to use when applying differential privacy. The query may also include one or more expressions indicating manipulations to the dataset the DP system 102 is to perform.

The DP system 102 determines 420 a privacy spend for the query, which is based on the contents of the query. In particular, the DP system 102 determines 420 a worst-case privacy spend based on the relation and the privacy parameters included in the query. The DP system 102 may factor for a sensitivity of the query in the determination 420. The privacy spend represents an amount of privacy of the dataset lost due to execution of the query.

The DP system 102 determines 430 whether the determined 420 privacy spend exceeds one or more privacy budgets. The one or more privacy budgets relate to either the client 104 or to the dataset. For example, the client 104 may be associated with a privacy budget particular to the client 104, as well as with a shared privacy budget for a group of clients in which the client 104 is included. Furthermore, the dataset may be associated with a privacy budget. If the DP system 102 does 460 determine 430 that the privacy spend exceeds at least one of the one or more privacy budgets, the DP system 102 blocks 462 the query. In an embodiment, the DP system 102 sends a message to the client 104 indicating that the query was blocked 462.

In an embodiment, one or more of the at least one privacy budgets include a soft privacy budget and a hard privacy budget. For each of these one or more privacy budgets, the DP system 102 determines 430 first whether the soft privacy budget is already exceeded. If so, the DP system 102 blocks 462 the query. If not, the DP system 102 checks whether the hard budget is exceeded by execution of the query. If so, the DP system 102 blocks 462 the query. If the soft budget is not exceeded prior to execution of the query, and the hard budget is not exceeded due to execution of the query, the DP system 102 performs the query, even if it exceeds the soft budget. If performance of the query exceeds the soft budget, additional queries may not be performed until a privacy budget refund is applied. If, upon application of the privacy budget refund, the soft budget remains exceeded, then no further queries may be performed. However, if, upon application of the privacy budget refund, the soft budget is no longer exceeded, then additional queries may be performed.

If the DP system 102 determines 430 that no 440 privacy budget of the one or more privacy budgets is exceeded by the determined 420 privacy spend, the DP system 102 executes 442 the query upon the dataset. The DP system 102 may then report the results of the execution 442 to the client 104. The DP system 102 records 444 the query at a log for the client 104, e.g. a log in the log store 310 that is associated with the client 104. Recording 444 the query at the log involves adding an entry to the log indicating the relation and the privacy spend, in terms of the privacy parameters. The DP system 102 decrements 448 the privacy budget based on the privacy spend, e.g. after successful execution of the query. Depending upon the embodiment, the DP system 102 decrements 448 the privacy budget at the privacy system 160 and/or the log store 310.

The DP system 102 performs 450 privacy budget refunding for the client 104 based on the relation and the log. The DP system 102 performs 450 the privacy budget refunding asynchronously 452. In one embodiment, the DP system 102 performs 450 privacy budget refunding periodically. Alternatively, the DP system 102 may perform 450 privacy budget refunding each time a new relation is added to the log. A relation added to the log is a new relation if it is not already in the log, e.g. from performance of a previous query.

Figure 5:
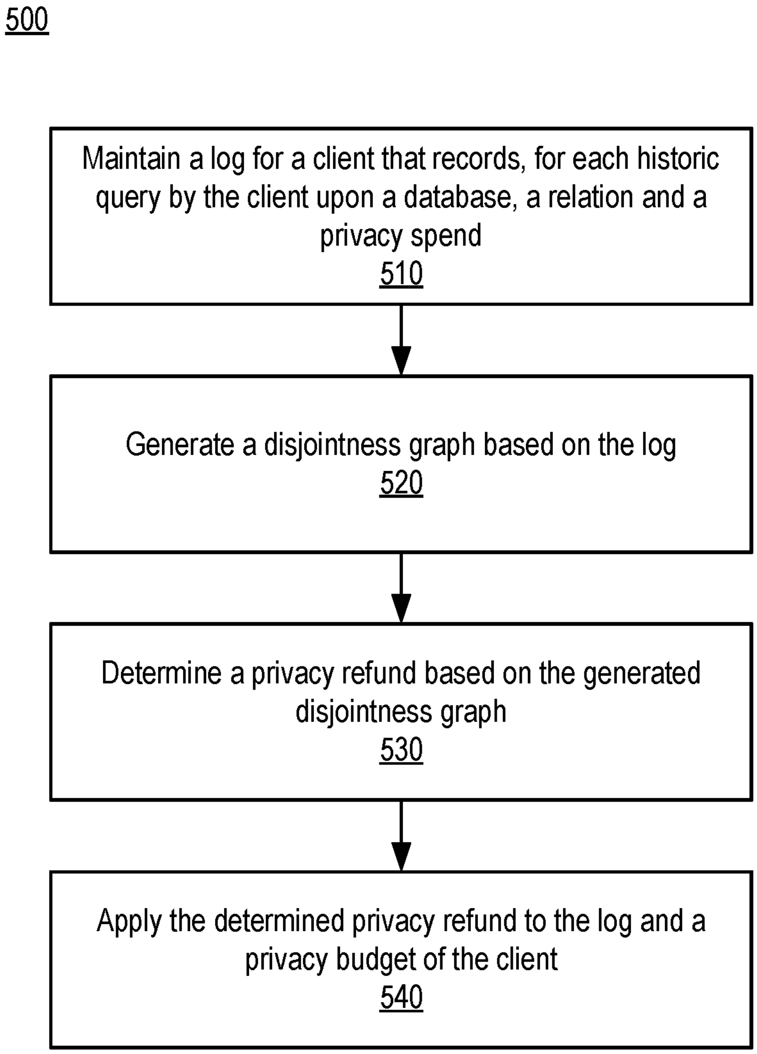
FIG. 5 illustrates a process for performing privacy budget refunding, according to one embodiment.

FIG. 5 illustrates a process 500 for performing privacy budget refunding, according to one embodiment. The DP system 102 maintains 510 a log for the client 104 that records, for each historic query by the client 104 upon the database 106, a relation included in the query representative of the dataset over which the query executed, and a privacy spend for the query. The privacy spend is recorded in terms of one or more privacy parameters.

The DP system 102 generates 520 a disjointness graph for the client 104 based on the maintained 510 log associated with the client 104. The disjointness graph represents relationships among relations over which the client 104 has queried, as well as the total worst-case privacy lost for each of the relations. The disjointness graph may be regenerated for each instance of determination of a privacy budget refund. Using the generated 520 disjointness graph, the DP system 102 determines 530 a privacy budget refund for the client 104. Depending upon the embodiment, the DP system 102 either identifies a MWIS of the disjointness graph or a MWVC of the disjointness graph. In the former case, the DP system 102 subtracts the sum of the privacy spends of the relations in the MWIS from the total worst-case spend of all relations in the log, the difference being the privacy budget refund. In the latter case, the DP system 102 determines the privacy budget refund as the sum of the privacy spends of the relations in the MWVC.

Upon determining 530 the privacy budget refund, the DP system 102 applies 540 the determined privacy budget refund to a privacy budget of the client 104 and records the application of the privacy budget refund in the log associated with the client 104. The privacy budget refund is applied 540 to the privacy budget such that it may be used as privacy spend for additional queries, and is recorded in the log as an additional entry such that future refunds do not doubly account for the privacy budget refund. In embodiments where the client 104 is associated with more than one privacy budget, the privacy budget refund is applied to each of the privacy budgets.

Computing Environment

Figure 6:
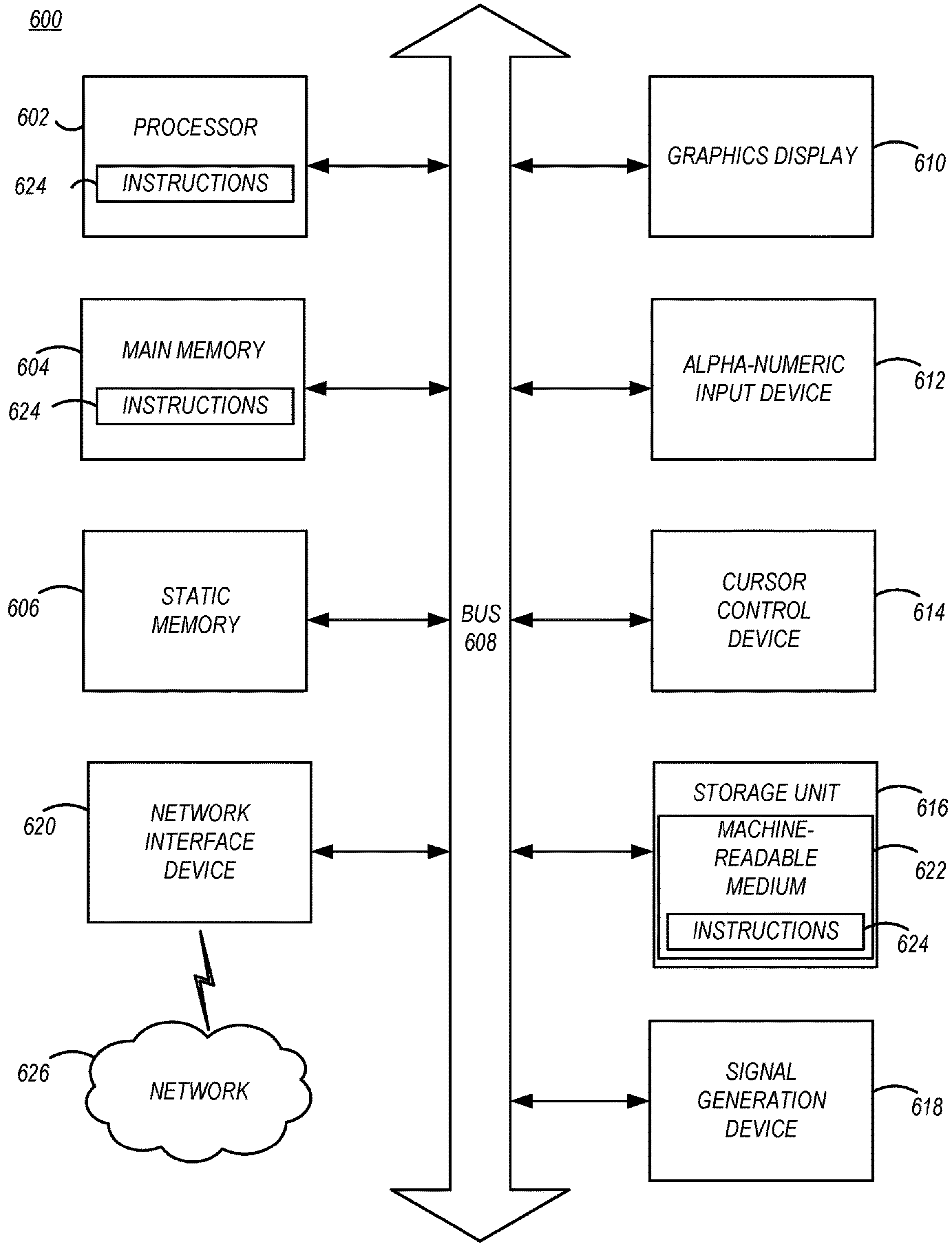
FIG. 6 is a block diagram illustrating components of an example machine able to read instructions from a machine readable medium and execute them in a processor or controller, according to one embodiment.

FIG. 6 is a block diagram illustrating components of an example machine able to read instructions from a machine readable medium and execute them in a processor or controller, according to one embodiment. Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 606 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

What is claimed is:

1. A system comprising:

a processor; and a non-transitory computer-readable storage medium storing computer program instructions executable by the processor to execute operations comprising:

executing a current query received from a client, the current query comprising a relation that specifies a set of data in a database upon which to execute the current query; and after executing the current query on the set of data:

recording the current query in a log;

determining whether the relation of the current query is included in any other query previously recorded in the log; and in response to determining that the relation is not included in any other query previously recorded in the log:

analyzing one or more relationships between the current query and one or more additional queries recorded in the log, the analyzing of the one or more relationships comprising generating a disjointness graph based on the current query and the one or more additional queries;

determining a privacy budget refund for the current query based on a sum of vertex weights of two or more vertices of the disjointness graph; and applying the privacy budget refund to a privacy budget associated with the client, the privacy budget being used to determine whether a subsequent query is to be executed on the database.

2. The system of claim 1, wherein the disjointness graph is a weighted undirected graph comprising:

a set of vertices each representing a relation in the log;

a set of vertex weights each associated with a different vertex in the set of vertices and representative of a total privacy spend recorded in the log for a select relation represented by the different vertex; and zero or more edges between pairs of vertices of the set of vertices, each individual edge representing a disjointness of relations represented by a pair of vertices of the individual edge.

3. The system of claim 2, wherein the determining of the privacy budget refund based on the sum of the vertex weights of the two or more vertices of the disjointness graph comprises:

determining a maximum weight independent set of vertices from the set of vertices based on the zero or more edges and the set of vertex weights;

determining the sum of the vertex weights of the two or more vertices, the two or more vertices comprising vertices in the determined maximum weight independent set of vertices;

determining a total privacy spend of all queries in the log; and determining the privacy budget refund as a difference between the total privacy spend of all queries in the log and the sum of the vertex weights.

4. The system of claim 2, wherein the determining of the privacy budget refund based on the sum of the vertex weights of the two or more vertices of the disjointness graph comprises:

determining a minimum weight vertex cover of vertices of the disjointness graph based on the zero or more edges and the set of vertex weights; and determining the privacy budget refund as the sum of the vertex weights of the two or more vertices, the two or more vertices comprising vertices in the minimum weight vertex cover of vertices.

5. The system of claim 1, wherein the operations comprise:

prior to executing the current query on the set of data, determining a worst-case privacy spend for the current query based the relation and a privacy parameter of the current query; and after executing the current query on the set of data, decrementing the worst-case privacy spend from the privacy budget associated with the client.

6. The system of claim 5, wherein the operations comprise:

prior to executing the current query on the set of data, recording the worst-case privacy spend with the current query in the log.

7. The system of claim 5, wherein the operations comprise:

determining whether the worst-case privacy spend exceeds the privacy budget associated with the client, the current query being executed responsive to the worst-case privacy spend not exceeding the privacy budget.

8. A non-transitory computer-readable storage medium storing computer program instructions executable by a processor to execute operations comprising:

executing a current query received from a client, the current query comprising a relation that specifies a set of data in a database upon which to execute the current query; and after executing the current query on the set of data:

recording the current query in a log;

determining whether the relation of the current query is included in any other query previously recorded in the log; and in response to determining that the relation is not included in any other query previously recorded in the log:

analyzing one or more relationships between the current query and one or more additional queries recorded in the log, the analyzing of the one or more relationships comprising generating a disjointness graph based on the current query and the one or more additional queries;

determining a privacy budget refund for the current query based on a sum of vertex weights of two or more vertices of the disjointness graph; and applying the privacy budget refund to a privacy budget associated with the client, the privacy budget being used to determine whether a subsequent query is to be executed on the database.

9. The non-transitory computer-readable storage medium of claim 8, wherein the disjointness graph is a weighted undirected graph comprising:

a set of vertices each representing a relation in the log;

a set of vertex weights each associated with a different vertex in the set of vertices and representative of a total privacy spend recorded in the log for a select relation represented by the different vertex; and zero or more edges between pairs of vertices of the set of vertices, each individual edge representing a disjointness of relations represented by a pair of vertices of the individual edge.

10. The non-transitory computer-readable storage medium of claim 9, wherein the determining of the privacy budget refund based on the sum of the vertex weights of the two or more vertices of the disjointness graph comprises:

determining a maximum weight independent set of vertices from the set of vertices based on the zero or more edges and the set of vertex weights;

determining the sum of the vertex weights of the two or more vertices, the two or more vertices comprising vertices in the determined maximum weight independent set of vertices;

determining a total privacy spend of all queries in the log; and determining the privacy budget refund as a difference between the total privacy spend of all queries in the log and the sum of the vertex weights.

11. The non-transitory computer-readable storage medium of claim 9, wherein the determining of the privacy budget refund based on the sum of the vertex weights of the two or more vertices of the disjointness graph comprises:

determining a minimum weight vertex cover of vertices of the disjointness graph based on the zero or more edges and the set of vertex weights; and determining the privacy budget refund as the sum of the vertex weights of the two or more vertices, the two or more vertices comprising vertices in the minimum weight vertex cover of vertices.

12. The non-transitory computer-readable storage medium of claim 8, wherein the operations comprise:

prior to executing the current query on the set of data, determining a worst-case privacy spend for the current query based the relation and a privacy parameter of the current query; and after executing the current query on the set of data, decrementing the worst-case privacy spend from the privacy budget associated with the client.

13. The non-transitory computer-readable storage medium of claim 12, wherein the operations comprise:

prior to executing the current query on the set of data, recording the worst-case privacy spend with the current query in the log.

14. The non-transitory computer-readable storage medium of claim 12, wherein the operations comprise:

determining whether the worst-case privacy spend exceeds the privacy budget associated with the client, the current query being executed responsive to the worst-case privacy spend not exceeding the privacy budget.

15. A method comprising:

executing, by one or more processors, a current query received from a client, the current query comprising a relation that specifies a set of data in a database upon which to execute the current query; and after executing the current query on the set of data:

recording, by the one or more processors, the current query in a log;

determining, by the one or more processors, whether the relation of the current query is included in any other query previously recorded in the log; and in response to determining that the relation is not included in any other query previously recorded in the log:

analyzing, by the one or more processors, one or more relationships between the current query and one or more additional queries recorded in the log, the analyzing of the one or more relationships comprising generating a disjointness graph based on the current query and the one or more additional queries;

determining, by the one or more processors, a privacy budget refund for the current query based on a sum of vertex weights of two or more vertices of the disjointness graph; and applying, by the one or more processors, the privacy budget refund to a privacy budget associated with the client, the privacy budget being used to determine whether a subsequent query is to be executed on the database.

16. The method of claim 15, wherein the disjointness graph is a weighted undirected graph comprising:

a set of vertices each representing a relation in the log;

a set of vertex weights each associated with a different vertex in the set of vertices and representative of a total privacy spend recorded in the log for a select relation represented by the different vertex; and zero or more edges between pairs of vertices of the set of vertices, each individual edge representing a disjointness of relations represented by a pair of vertices of the individual edge.

17. The method of claim 16, wherein the determining of the privacy budget refund based on the sum of the vertex weights of the two or more vertices of the disjointness graph comprises:

determining a maximum weight independent set of vertices from the set of vertices based on the zero or more edges and the set of vertex weights;

determining the sum of the vertex weights of the two or more vertices, the two or more vertices comprising vertices in the determined maximum weight independent set of vertices;

determining a total privacy spend of all queries in the log; and determining the privacy budget refund as a difference between the total privacy spend of all queries in the log and the sum of the vertex weights.

18. The method of claim 16, wherein the determining of the privacy budget refund based on the sum of the vertex weights of the two or more vertices of the disjointness graph comprises:

determining a minimum weight vertex cover of vertices of the disjointness graph based on the zero or more edges and the set of vertex weights; and determining the privacy budget refund as the sum of the vertex weights of the two or more vertices, the two or more vertices comprising vertices in the minimum weight vertex cover of vertices.

19. The method of claim 15, comprise:

prior to executing the current query on the set of data, determining, by the one or more processors, a worst-case privacy spend for the current query based the relation and a privacy parameter of the current query; and after executing the current query on the set of data, decrementing, by the one or more processors, the worst-case privacy spend from the privacy budget associated with the client.

20. The method of claim 19, comprise:

prior to executing the current query on the set of data, recording, by the one or more processors, the worst-case privacy spend with the current query in the log.

* * * * *